US007986587B2

(12) United States Patent
Duncan et al.

(10) Patent No.: US 7,986,587 B2
(45) Date of Patent: Jul. 26, 2011

(54) METHOD FOR IMAGING THE EARTH'S SUBSURFACE USING PASSIVE SEISMIC SENSING

(75) Inventors: Peter M. Duncan, Houston, TX (US); James D Lakings, Houston, TX (US)

(73) Assignee: Microseismic, Inc., Houston, TX (US)

( * ) Notice: Subject to any disclaimer, the term of this patent is extended or adjusted under 35 U.S.C. 154(b) by 595 days.

(21) Appl. No.: 12/051,962

(22) Filed: Mar. 20, 2008

(65) Prior Publication Data

US 2009/0238040 A1 Sep. 24, 2009

(51) Int. Cl.
*G01V 1/00* (2006.01)

(52) U.S. Cl. .............................................. 367/40; 367/38

(58) Field of Classification Search .................... 367/37, 367/38, 40
See application file for complete search history.

(56) References Cited

U.S. PATENT DOCUMENTS

| | | | |
|---|---|---|---|
| 5,148,110 A | 9/1992 | Helms | |
| 5,377,104 A | 12/1994 | Sorrells et al. | |
| 5,774,419 A | 6/1998 | Uhl et al. | |
| 5,934,373 A | 8/1999 | Warpinski et al. | |
| 5,996,726 A | 12/1999 | Sorrells et al. | |
| 6,049,508 A | 4/2000 | Delflandre | |
| 6,389,361 B1 | 5/2002 | Geiser | |
| 6,414,492 B1 | 7/2002 | Meyer et al. | |
| 6,462,549 B1 * | 10/2002 | Curtis et al. | 324/323 |
| 6,885,918 B2 | 4/2005 | Harmon et al. | |
| 6,947,843 B2 | 9/2005 | Fisher et al. | |
| 6,985,816 B2 | 1/2006 | Sorrells et al. | |
| 7,127,353 B2 | 10/2006 | Geiser | |
| 7,383,133 B1 | 6/2008 | Scott | |
| 7,660,198 B2 * | 2/2010 | Arrowsmith et al. | 367/40 |
| 7,706,211 B2 * | 4/2010 | Bakulin et al. | 367/38 |
| 2006/0062084 A1 * | 3/2006 | Drew | 367/68 |
| 2006/0190181 A1 | 8/2006 | Deffenbaugh et al. | |
| 2009/0259406 A1 * | 10/2009 | Khadhraoui et al. | 702/14 |

OTHER PUBLICATIONS

International Search Report and Written Opinion, U.S. Appl. No. PCT/US09/37220.
Clarebout, Synthesis of a Layered Medium From Its Acoustic Transmission Response, Geophysics v. 33, No. 2 (Apr. 1968).

\* cited by examiner

*Primary Examiner* — Jack Keith
*Assistant Examiner* — Krystine Breier
(74) *Attorney, Agent, or Firm* — Richard A. Fagin

(57) ABSTRACT

A method of imaging the Earth's subsurface using passive seismic emissions includes detecting seismic signals originating from within the Earth's subsurface over a selected time period using an array of seismic sensors deployed proximate the Earth's surface. Hypocenters of seismic events in the subsurface are determined from the detected signals. Seismic signals detected at selected ones of the seismic sensors are cross-correlated to signals detected at other selected ones of the seismic sensors. The cross-correlated signals are processed to obtain a reflectivity series at a geodetic position of the selected one of the seismic sensors. A spatial distribution of at least one seismic property in the subsurface is determined using the determined hypocenters and the reflectivity series.

7 Claims, 2 Drawing Sheets

METHOD FOR IMAGING THE EARTH'S SUBSURFACE USING PASSIVE SEISMIC SENSING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic imaging of the Earth's subsurface. More specifically, the invention relates to imaging of the Earth's subsurface using passive seismic sensing techniques.

2. Background Art

Passive seismic emission sensing techniques include detecting seismic signals from within the Earth's subsurface. As contrasted with conventional controlled source seismic exploration techniques (wherein a seismic source is actuated near the Earth's surface), in passive seismic sensing, the seismic signals are generated by seismic events taking place within the Earth's subsurface. The subsurface seismic events may be naturally-occurring or may be induced by man-made activities. The seismic signals are detected by an array of seismic sensors positioned at or near the Earth's surface generally above a target volume within the Earth's subsurface. Applications for passive seismic emission tomography include, for example, determining the point of origin of micro-earthquakes caused by movement along geologic faults, i.e., breaks in rock layers or formations, monitoring of fluid movement within the Earth's subsurface, and monitoring of fluid injected into the Earth's subsurface, e.g., in a hydraulic fracturing process or in monitoring movement of a fluid contact in a subsurface reservoir.

In some cases it may be undesirable to use conventional controlled source seismic techniques for evaluating the Earth's subsurface, for example, if a particular area is environmentally sensitive so as to make access and use of seismic sources unsafe or impracticable. There is a need for passive seismic methods that can make three dimensional images of the Earth's subsurface similar to those obtained using conventional controlled source seismic exploration techniques.

One technique for passive seismic imaging is known as passive seismic transmission tomography ("PSTT"). PSTT is known in the art for producing three dimensional ("3-D") images of the subsurface. PSTT can produce such images of the Earth's subsurface using observed travel time of seismic signals originating from micro-earthquakes occurring below or beside a target image volume in the subsurface. An array of seismic sensors, typically three-component geophones or other particle motion sensors is disposed near the Earth's surface (or on the bottom of a body of water in marine surveys) above the target volume in the subsurface. Typical imaging areas for such an array may be on the order of 300 to 1500 km$^2$. The three-component seismic sensors may be placed 10 to 30 or more meters below the Earth's surface in land-based surveys to avoid the noisy surface environment. Selected numbers of such sensors may be arranged in groups coupled to various stations at the Earth's surface. The stations may store recorded signal data locally, but may also be linked to a processing center by some form of telemetry. Travel time inversion is used to estimate the compressional and/or shear wave velocity distribution in the target volume from the recorded signals. As more events are observed, the velocity distribution can be estimated to a finer resolution. While effective, PSTT may provide ambiguous results or may require very long signal recording time to generate unique results.

There continues to be a need for improved methods of imaging the Earth's subsurface using passive seismic acquisition techniques.

SUMMARY OF THE INVENTION

A method of imaging the Earth's subsurface using passive seismic sensing according to one aspect of the invention includes detecting seismic signals originating from within the Earth's subsurface over a selected time period using an array of seismic sensors deployed proximate the Earth's surface. Hypocenters of seismic events in the subsurface are determined from the detected signals. Seismic signals detected at selected ones of the seismic sensors are cross-correlated to signals detected at other selected ones of the seismic sensors. The cross-correlated signals are processed to obtain a reflectivity series at a geodetic position of the selected one of the seismic sensors. A spatial distribution of at least one seismic property in the subsurface is determined using the determined hypocenters and the reflectivity series.

Other aspects and advantages of the invention will be apparent from the following description and the appended claims.

DETAILED DESCRIPTION

Figure 1:
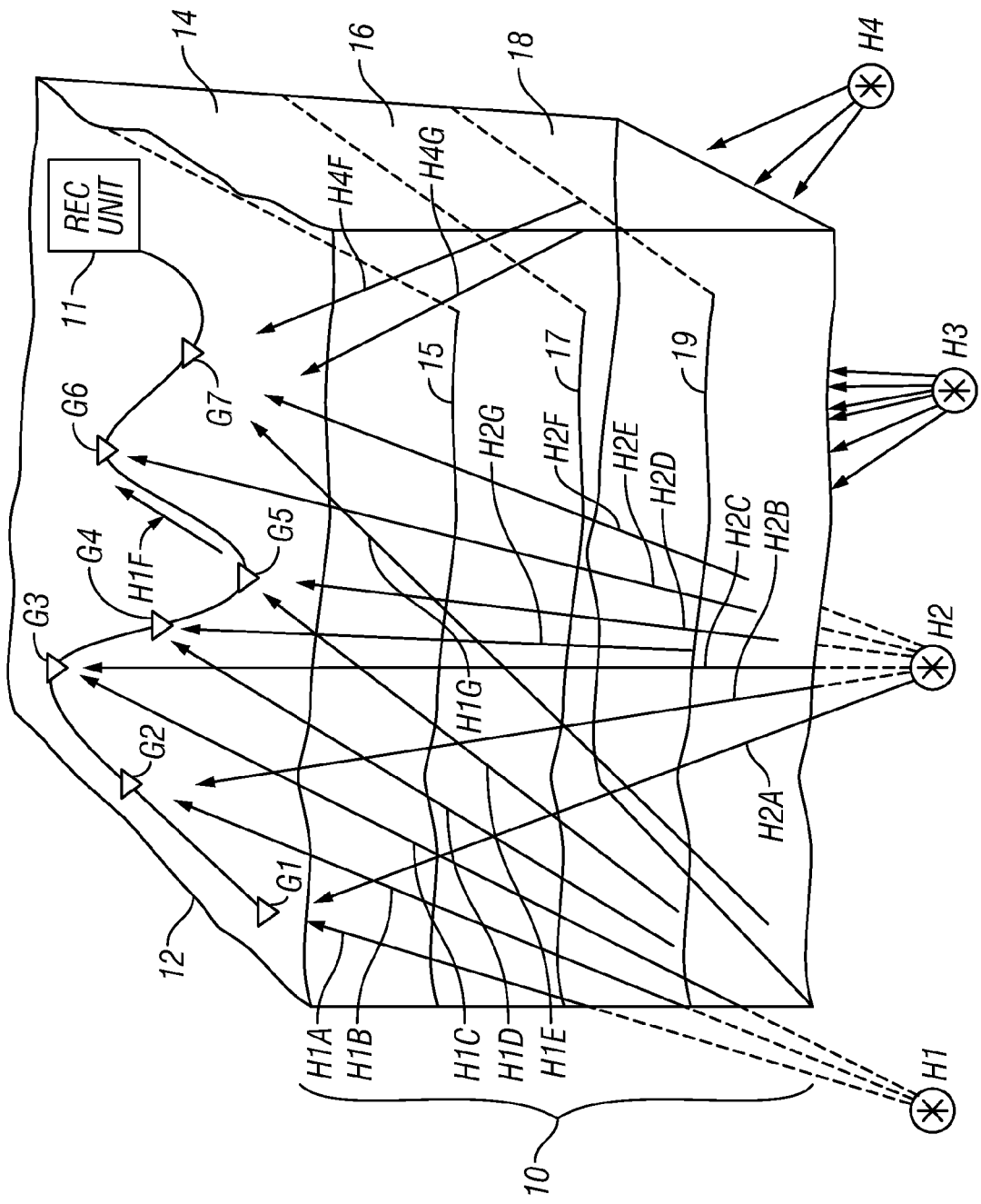
FIG. 1 shows an arrangement of seismic sensors used in a passive seismic emission technique.

FIG. 1 shows an array of seismic sensors, individually identified as G1 through G7, disposed at selected positions near or on the surface 12 of the Earth above a volume 10 of the Earth's subsurface to be imaged using passive seismic signals. The subsurface volume 10 may include a plurality of different formations, examples of which are shown at 14, 16 and 18, each having distinct seismic properties (e.g., acoustic impedance). A boundary 15, 17, and 19 may represent the surface that separates two adjacent formations 14, 16 and 18, respectively. The seismic sensors G1 through G7 may be one- or three-component particle motion sensors, such as geophones, accelerometers or any similar During recording of the signals produced by each of the seismic sensors G1-G7, various microearthquakes or other seismic events, shown at their possible points or origin ("hypocenters") H1, H2, H3 and H4, may occur in the subsurface in or below the volume 10. The seismic events each produce seismic energy that travels from the point of origin of the seismic event outwardly in all directions. Some of the seismic energy may travel through the volume 10 where it is eventually detected by the sensors G1-G7. Energy traveling from a first one of the seismic events, e.g., H1, is shown traveling along ray paths H1A through H1G to respective seismic sensors G1 through G7. A similar illustration is provided for energy from a second one of the seismic events, shown at H2, where seismic energy travels along ray paths indicated by H2A through H2G to respective seismic sensors G1 through G7. For clarity of the illustration, only a portion of corresponding ray paths for seismic energy are shown for the other two seismic events H3, H4 shown in FIG. 1, but the principle is the same for these and any other seismic events in the subsurface. Recording of seismic signals may be performed for a selected period of time, for example several days or weeks. The recording unit 11 may preferably make digital records, indexed with respect to time, of the seismic signals detected by each of the seismic sensors G1-G7.

The recorded seismic signals may be processed initially by certain procedures well known in the art of seismic data processing, including various forms of filtering, prior to interpretation according to the invention.

The spatial position hypocenter of each seismic event H1 through H4 may be determined from the recordings of the sensor signals using well known techniques. One such technique is described in, W. H. K. Lee and S. W. Stewart, *Principles and Applications of Microearthquake Networks*, Advances in Geophysics, Supplement 2, Academic Press (1981). Once the hypocenter of each seismic event is determined, a travel path may be determined for the seismic energy through the volume 10. Each travel path may begin at a calculated entry point into the volume and extend to an exit point corresponding to the geodetic position of each seismic sensor G1-G7. If a sufficient number of different seismic energy ray paths are traversed by seismic energy from various seismic events in the subsurface, a model of the seismic property (e.g., velocity) distribution within the volume 10 may be determined using various techniques, such as inversion.

Another possible technique for determining the hypocenters of the various seismic events in the subsurface is described in U.S. Patent Application Publication No. 2008/0068928 filed by Duncan et al., the underlying patent application for which is assigned to the assignee of the present invention, and the content of which is incorporated herein by reference. A method for seismic event mapping described in the '928 publication includes transforming seismic signals recorded at selected positions into a domain of possible spatial positions of a source of seismic events. An origin in spatial position and time of at least one seismic event is determined from space and time distribution of at least one attribute of the transformed seismic data.

As is known in the art, methods for determining a model of velocity distribution may require a very long signal recording time to provide a sufficiently well spatially distributed set of seismic events, or the method may provide ambiguous results. In a method according to the invention, a second data processing technique may be used in connection with velocity inversion to constrain the model of velocity distribution such that a unique result may be obtained with substantially reduced signal recording time.

One example of such second data processing technique according to the invention includes cross-correlating the recorded seismic signals from each seismic sensor G1-G7 with the recorded seismic signals from each one of a plurality of the other seismic sensors G1-G7 in the sensor arrangement. In some examples, the cross correlation of signals from each seismic sensor may be performed with signals from every one of the other seismic sensors. Cross correlation in the present example may include comparing the entire data record (i.e. over the entire selected recording time period) from the seismic sensor signal in question to the entire data record from the cross-correlated sensor signal. The comparing begins with a time offset between compared data records of zero and increments a time offset by a selected time amount (e.g., 1/4, 1/2, or 1 millisecond) for each of a plurality of subsequent comparisons. The time offset may be limited to the expected deepest seismic travel time for the target volume 10 (e.g., three to five seconds). Thus, for each cross-correlated sensor signal, an output of the cross correlation will be a time series beginning at zero time and ending at the selected time limit. An amplitude value for each time in the time series will be the degree of similarity of the cross-correlated sensor signal to the sensor signal in question.

In some examples, each sensor signal may be auto-correlated, that is, the signal record may be compared with itself at various values of time delay, just as for the cross-correlation.

The result of the cross-correlation, and the auto-correlation if performed, is a set of "traces" for each seismic sensor that correspond to seismic signals that would be recorded at such sensor if a seismic energy source were actuated at each one of the cross-correlated sensor locations.

The cross correlations made for each sensor may be processed according to well known techniques for controlled (active) source seismic exploration, including for example, normal moveout correction, and summing or stacking to produce, for each such sensor, a band limited reflectivity series for the Earth's subsurface corresponding to the geodetic position of the sensor under investigation. The reflectivity series represents a record with respect to seismic travel time of reflection coefficients of each of what are inferred as subsurface acoustic impedance boundaries in the Earth's subsurface. In some examples, the reflectivity series may be used to constrain an inversion procedure used to obtain a velocity distribution from the hypocenters determined as explained above.

Figure 2:
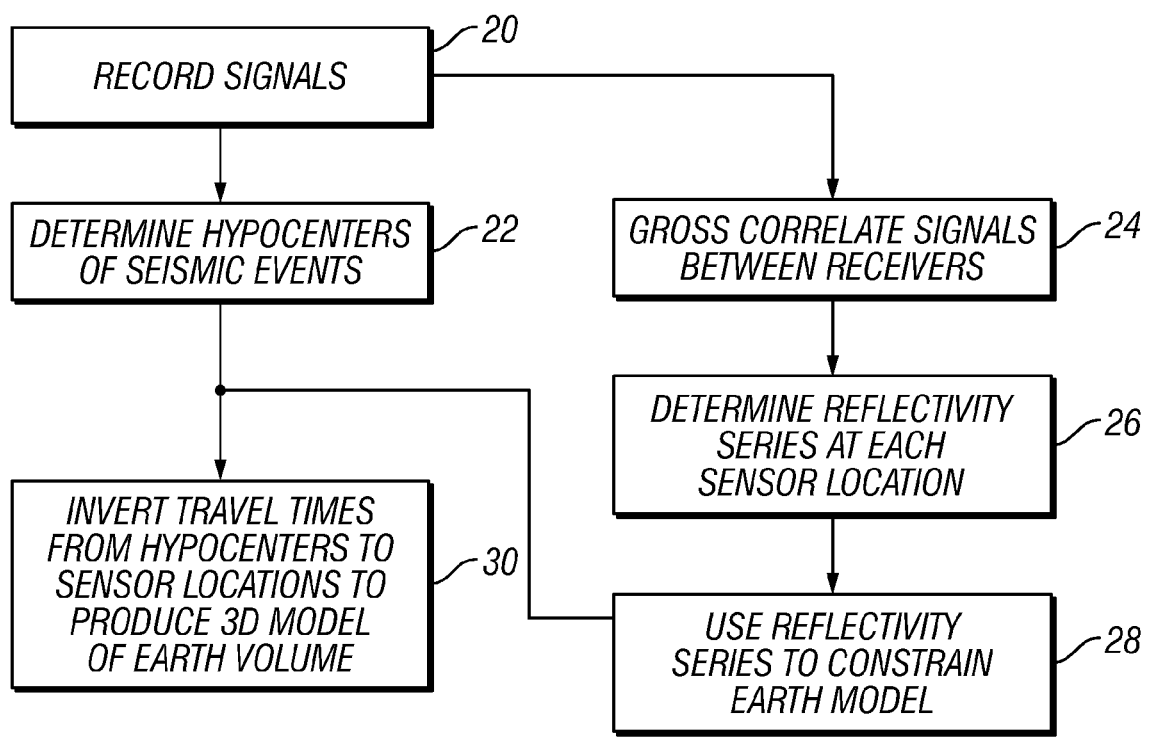
FIG. 2 is a flowchart illustrating a method of imaging the Earth's subsurface using passive seismic emission sensing.

An example implementation of a method according to the invention is shown in a flow chart in FIG. 2. Seismic signals are recorded from each of a plurality of deployed seismic sensors at 20. Hypocenters of seismic events in the subsurface are determined at 22. Signals from each of the sensors are cross-correlated to signals from a plurality of the other sensors at 24. The cross-correlated signals may be used, at 26, to determine a reflectivity series at each cross-correlated sensor. At 28, the reflectivity series may be used to constrain a model of spatial distribution of a seismic property (e.g., velocity) in the subsurface volume. At 30, the hypocenters may be used, along with the constraints, to generate a model of spatial distribution of the seismic property.

A three dimensional image of the Earth's subsurface may be made using the above spatial distribution of the seismic property. Any suitable three dimensional ("3D") seismic image software or tool known in the art may be used to generate the 3D image of the Earth's subsurface formation. Two non-limiting examples of such imaging software include those sold under the trademarks Ω-TIME and Ω-DEPTH, both of which are trademarks of WesternGeco LLC, Houston, Tex.

Seismic imaging techniques according to the various examples of the invention may provide images of the Earth's subsurface without the need to use controlled seismic energy sources such as vibrators or dynamite. By eliminating the need for controlled seismic energy sources, techniques according to the invention may present less environmental hazard than controlled source seismic techniques, and may provide access to seismic exploration where surface topographic conditions make controlled seismic exploration techniques impracticable.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of imaging the Earth's subsurface using passive seismic emissions, comprising:

detecting seismic signals originating from within the Earth's subsurface over a selected time period using an array of seismic sensors deployed proximate the Earth's surface;

determining hypocenters of seismic events in the subsurface from the detected signals;

cross-correlating seismic signals detected at selected ones of the seismic sensors to signals detected at other selected ones of the seismic sensors;

processing the cross-correlated seismic signals at the selected ones of the seismic sensors to determine a reflectivity series at a geodetic position of each of the selected ones of the seismic sensors; and determining a spatial distribution of at least one seismic property in the subsurface using the determined hypocenters and the reflectivity series.

2. The method of claim 1, wherein cross-correlating comprises determining a degree of similarity between an entire signal record of the selected ones of the seismic sensors and an entire signal record of each of the other selected ones of the seismic sensors.

3. The method of claim 2, wherein determining a degree of similarity is performed for a selected range of time offset.

4. The method of claim 1 wherein the determining hypocenters comprises transforming the detected seismic signals into a domain of possible hypocenters, determining a space and time distribution of at least one attribute of the transformed seismic data, and determining the hypocenters from the space and time distribution of the at least one attribute.

5. The method of claim 1 wherein the determining spatial distribution comprises inversion processing a modeled spatial distribution with respect to possible seismic ray paths between the determined hypocenters and geodetic positions of the seismic sensors.

6. The method of claim 5 wherein the modeled spatial distribution is constrained by the reflectivity series determined from the cross correlating.

7. The method of claim 1 wherein the at least one seismic property comprises velocity.

* * * * *